United States Patent
Kroon et al.

(10) Patent No.: US 9,942,536 B2
(45) Date of Patent: Apr. 10, 2018

(54) AUTOSTEREOSCOPIC DISPLAY DEVICE

(71) Applicant: KONINKLIJKE PHILIPS N.V., Eindhoven (NL)

(72) Inventors: Bart Kroon, Eindhoven (NL); Mark Thomas Johnson, Arendonk (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 40 days.

(21) Appl. No.: 14/771,598

(22) PCT Filed: Mar. 7, 2014

(86) PCT No.: PCT/IB2014/059527
§ 371 (c)(1),
(2) Date: Aug. 31, 2015

(87) PCT Pub. No.: WO2014/141018
PCT Pub. Date: Sep. 18, 2014

(65) Prior Publication Data
US 2016/0021361 A1 Jan. 21, 2016

Related U.S. Application Data

(60) Provisional application No. 61/776,265, filed on Mar. 11, 2013.

(51) Int. Cl.
*G02B 27/22* (2006.01)
*H04N 13/04* (2006.01)
*G02B 5/18* (2006.01)

(52) U.S. Cl.
CPC ....... *H04N 13/0404* (2013.01); *G02B 5/1876* (2013.01); *G02B 27/225* (2013.01); *G02B 27/2214* (2013.01); *H04N 13/0422* (2013.01)

(58) Field of Classification Search
CPC .... G02B 27/2214; G02B 5/1876; G02B 3/08; G02B 3/005; H04N 13/0404; H04N 13/0409
(Continued)

(56) References Cited

U.S. PATENT DOCUMENTS 5,703,436 A * 12/1997 Forrest .................. C09K 11/06
                                                                        257/E33.056
5,850,580 A * 12/1998 Taguchi ................. G02B 3/005
                                                                        348/E13.008
(Continued)

FOREIGN PATENT DOCUMENTS

EP    0712032 A2    5/1996
WO    03015424 A2   2/2003
WO    2011132448 A1 10/2011

OTHER PUBLICATIONS

Giménez, Fernando, et al., "Fractal Photon Sieve," Optical Society of America, 2006 (6 pages).
(Continued)

*Primary Examiner* — Audrey Y Chang

(57) ABSTRACT

A stacked display has the different color layers (20r), (20g), (20b) ordered with respect to the wavelength-dependency of the lens focus so that there is better focus of the colors on the display layers that modulate those colors. The optical system (30), (32) can be designed to have a wavelength-dependent focus that matches the position of each of the light modulating layers.

17 Claims, 6 Drawing Sheets

Fresnel Zone Plate

Fractal Zone Plate

(58) Field of Classification Search
USPC .......................... 359/463, 565; 313/506, 501
See application file for complete search history.

(56) References Cited

U.S. PATENT DOCUMENTS

| | | | |
|---|---|---|---|
| 6,911,772 B2* | 6/2005 | Cok | ................... H01L 27/3211 |
| | | | 313/113 |
| 7,692,859 B2 | 4/2010 | Redert et al. | |
| 2002/0114078 A1 | 8/2002 | Halle et al. | |
| 2005/0168820 A1* | 8/2005 | Yun | ......................... G02B 3/08 |
| | | | 359/565 |
| 2006/0171041 A1 | 8/2006 | Olmstead et al. | |
| 2008/0002255 A1 | 1/2008 | Tavor et al. | |
| 2008/0285136 A1 | 11/2008 | Jacobowitz et al. | |
| 2009/0021678 A1* | 1/2009 | Son | ................... G02F 1/133305 |
| | | | 349/122 |
| 2010/0142014 A1 | 10/2010 | Rosen et al. | |
| 2011/0228181 A1 | 9/2011 | Jeong et al. | |
| 2012/0139956 A1 | 6/2012 | Joseph et al. | |

OTHER PUBLICATIONS

Mendoza-Yero et al "Fractal Generalized Zone Plates" 2008 Optical Society of America, vol. 26, No. 5, May 2009.
Furlan et al. "Fractal Zone Plates for Wideband Imaging With Low Chromatic Aberration and Extended Depth of Field" Jan. 18, 2007, URL: Https:Arxiv.Org/Ftp/Physics/Papers/0701/0701211.PDF.

* cited by examiner

Fresnel Zone Plate

Fractal Zone Plate

Fractal Photon Sieve

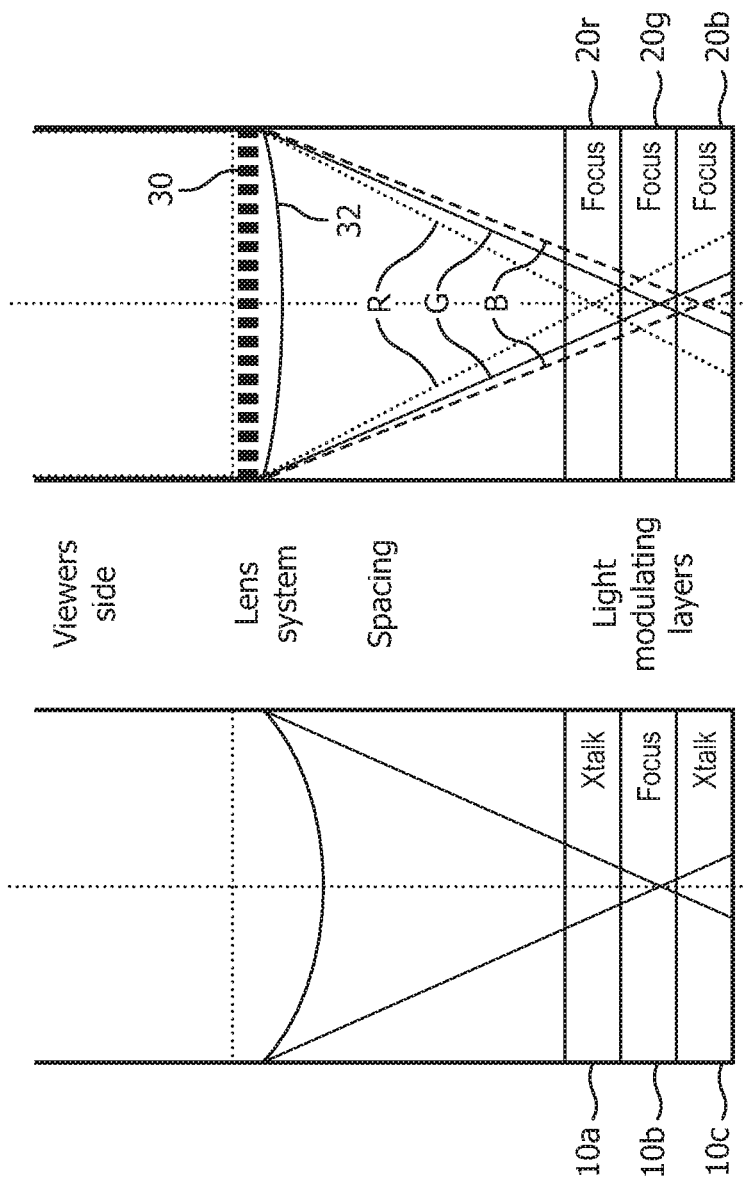

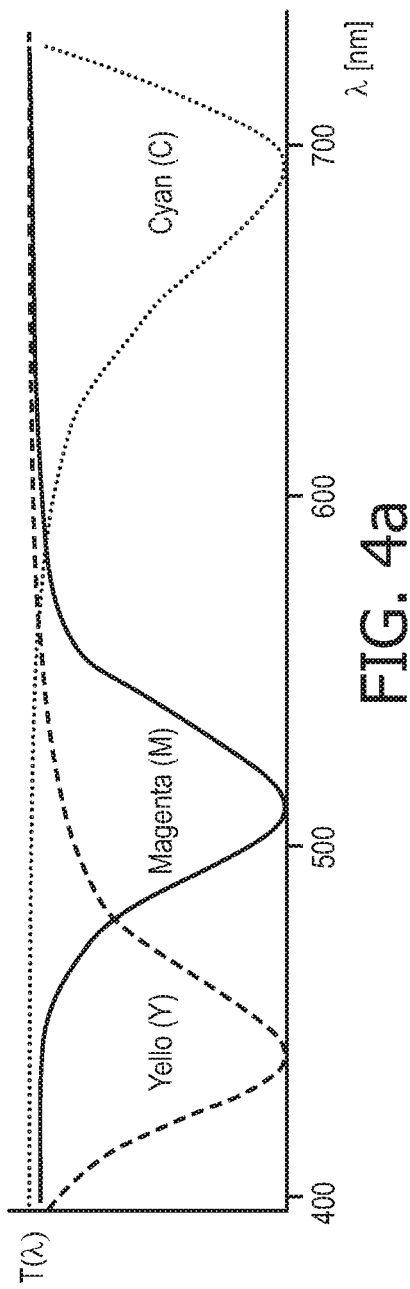
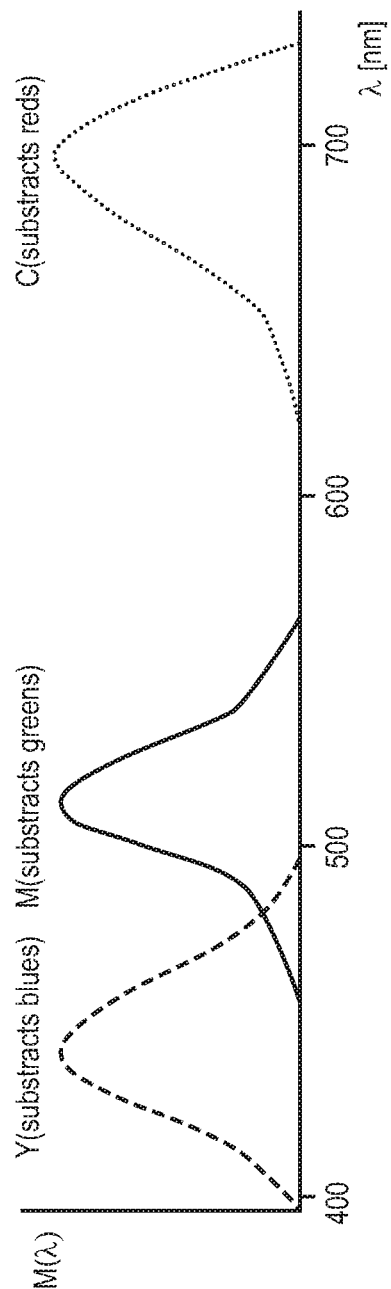
FIG. 4a
FIG. 4b

AUTOSTEREOSCOPIC DISPLAY DEVICE

CROSS-REFERENCE TO PRIOR APPLICATIONS

This application is the U.S. National Phase application under 35 U.S.C. § 371 of International Application No. PCT/IB2014/059527, filed on Mar. 7, 2014, which claims the benefit of U.S. Provisional Patent Application No. 61/776,265, filed Mar. 11, 2013. These applications are hereby incorporated by reference herein.

FIELD OF THE INVENTION

This invention relates to autostereoscopic displays based on lenticular arrays.

BACKGROUND OF THE INVENTION

Most common colour displays have a pixel structure with multiple colour components next to each other. Examples of such pixel structures are RGB stripes and the so-called "PenTile" arrangement. These arrangements require sub-pixellation, so that the native resolution of the display (i.e. the sub-pixels) is higher than the resolution of the image (i.e. the pixels).

An alternative is to employ emissive layers that are also transparent. A pixel is formed by multiple layers with each layer capable of emitting light in a selected colour. Organic light emitting diode (OLED) technology is one example that allows such a display to be formed. By stacking the transparent sub-pixel layers, the resolution of each sub-pixel layer only needs to be as high as the eventual pixel resolution of the display.

Reflective display techniques are also known, such as electrowetting displays and electrophoretic displays. These are in principle able to provide nearly full-gamut colour if combined in layers with a subtractive colour system such as cyan-magenta-yellow (CMY).

Limited colour displays are also known, which have only two colour components. An example is a subtractive colour system with black and red. Another example is an additive colour system with just blue and green.

The index of refraction (IOR) of optical materials such as glass and plastic is not a constant but rather depends on the wavelength due to dispersion. One way to describe the dispersion of a material is by the Abbe number. Dispersion in lenses creates chromatic aberration. The difference in focal length of red and blue is referred to as axial chromatic aberration. Chromatic aberration in the focal plane is lateral chromatic aberration. In photo camera lenses, techniques such as the use of an achromatic doublet are employed to avoid both types of chromatic aberration.

FIG. 1 shows an alternative type of lens based on diffraction. These lenses rely on the interference of light in a repetitive structure.

Diffractive components alter the phase and/or amplitude of light.

A Fresnel zone plate is shown in FIG. 1($a$) and a fractal zone plate is shown in FIG. 1($b$). These are flat structures, but they can focus light. A photon sieve, such as a fractal photon sieve as shown in FIG. 1($c$) is a similar structure that has favourable properties.

The primary focal length of a zone plate (f) is given by $R_m^2/m\lambda$ with $R_m$ being the radius of the $m^{th}$ ring. Thus, the focal length has a direct but inverse relation with the wavelength. For diffractive lenses, blue (e.g. 475 nm) has a longer focus than red (e.g. 650 nm) because of this relation. The width of the outmost zone ($\Delta R_m$) may be approximated by $f\lambda/2R_m$.

This zone width is an approximation that works for large m, so in this case $R_m$ would typically be the outmost zone. The width of the zones decreases with radius, so the outmost zone determines the required manufacturing precision.

FIG. 2 shows the light intensity as a function of axial distance from a lenticular lens structure for red, green and blue light passing through the lens structure. FIG. 2($a$) is for a Fresnel zone plate and FIG. 2($b$) is for a Fresnel photon sieve. The intensity peaks correspond to the locations at which the light is focussed, and it can be seen that the different colours are focussed at different distances from the lens.

In a lenticular based autostereoscopic display, a lens overlies a group of sub-pixels in the row direction. In this way, the output of each sub-pixel in the group is imaged by the lens to a different viewing direction. At the intended viewing distance, adjacent pixels are imaged to locations spaced apart by the inter-ocular distance of around 60 mm, so that different eyes see a different sub-pixel set. In this way, autostereoscopic viewing is enabled, with different images provided simultaneously to the two eyes.

If a lenticular display is created from a thick stacked display, then the focus of the lens is optimal (i.e. with the focal plane at the display pixel plane) only for a small range of wavelengths—i.e. the wavelength corresponding to the stack colour which is at the focal plane. This may for instance be all saturated greenish colours. Other colours and white create 3D crosstalk.

SUMMARY OF THE INVENTION

The invention is defined by the claims.

According to the invention, there is provided an autostereoscopic display device comprising:

a display arrangement for providing a pixelated display output; and a lens arrangement for directing different views in different directions thereby enabling autostereoscopic viewing, wherein the display arrangement comprises a stack of display layers, comprising at least a first and second display layer, each layer for modulating one colour or a set of colours, wherein the lens arrangement has a first focal distance for a first colour and a second focal distance for a second colour, and wherein the first display layer is closer to the first focal distance than the second focal distance and modulates the first colour and the second display layer is closer to the second focal distance than the first focal distance and modulates the second colour.

Colour display technologies such as stacked red, green and blue OLED layers, and electrophoretic cyan, magenta and yellow layers compose a full-colour image out of multiple pixelated layers. When applying such a display panel in a 3D lenticular display, and when those layers are thick in relation to the focal length of the optical system, then the focus and thus 3D image quality is compromised. Optical dispersion means that the focus of a lens is wavelength dependent.

The system of the invention orders the light modulating layers with respect to the wavelength-dependency of the lens focus such that each colour is in focus. In particular, for an RGB system, green is in the middle of the layers, and for a CMY system, magenta (M) is in the middle. Thus, more generally if there are three display layers, the central layer modulates the colour that is most central to the visible spectrum.

It is noted that the term "modulate" is intended to cover the generation of a light output of desired intensity (i.e. a modulated output is generated) as well as the processing of incident light to change the intensity of a particular frequency component i.e. colour.

The "modulating colour" of a pixel component can be defined as the wavelength range that corresponds to maximum modulation. For example an emissive display layer that switches between non-emissive and emissive red may modulate in a range of 600 nm to 700 nm, with a maximum modulation at 640 nm. For example, a non-emissive (i.e. subtractive) pixel component that switches between yellow (590 nm) and transparent, may have the strongest modulation for (a blue of) 450 nm and may modulate strongly in a wavelength range from 400 nm to 500 nm. The optical system preferably has a wavelength-dependent focus that matches the position of each of the light modulating layers.

In this way, each light modulating layer can be at a focal distance for the modulating colour (as defined above). By this is meant that the focus of the lens in respect of a viewer at the designed viewing distance lies closest to, and preferably within, that display layer. In practice, the distance of the viewer from the lens is so large compared to the focal distance of the lens, that the focal plane of the lens can be considered to be the focal plane for parallel outgoing light (i.e. to infinity) rather than outgoing light to the viewer location. The position of a focal distance should be understood to refer to the plane at that distance from the optical (lens) structure, on the display panel side of the optical structure. i.e. in the region where the display pixels are located.

Thus, in a first example, the display layers comprise a light emissive layer for generating a red light output, a light emissive layer for generating a green light output, and a light emissive layer for generating a blue light output.

The lens arrangement can comprise a refractive lens arrangement, and the display layers are then ordered, in the direction starting at the lens arrangement blue, green then red.

This means that the lens focus is matched to the location of the light emissive layer.

The lens arrangement can instead comprise a diffractive lens arrangement, and the display layers are then ordered, in the direction starting at the lens arrangement red, green then blue.

This again means that the lens focus is matched to the location of the light emissive layer, because the lens focus has an opposite dependency on frequency compared to a refractive lens. Thus, in both cases, the green layer is in the middle.

The diffractive lens arrangement can for example comprise a Fresnel zone plate, a fractal zone plate or a fractal photon sieve.

In another set of examples, the display layers comprise a cyan light subtractive layer for subtracting red light output, a magenta light subtractive layer for subtracting a green light output, and a yellow light subtractive layer for subtracting a blue light output. This subtractive arrangement can for example use electrophoretic display technology.

The lens arrangement can again comprise a refractive lens arrangement, and the display layers are ordered, in the direction starting at the lens arrangement yellow, magenta then cyan.

The lens arrangement can instead comprise a diffractive lens arrangement, and the display layers are ordered, in the direction starting at the lens arrangement cyan, magenta then yellow.

The diffractive lens arrangement can for example comprise a Fresnel zone plate, a fractal zone plate or a fractal photon sieve.

The subtractive display can be a reflective display having a reflector on the opposite side of the display layers to the lens arrangement. This means the light makes two paths through the subtractive layers. Alternatively, a backlight can be provided in which case light passes through the light modulating layers only once.

In another arrangement, the display layers comprise a first light subtractive layer comprising the combination of two colours from cyan, magenta, yellow and black and a second light subtractive layer comprising the combination of the other two colours from cyan, magenta, yellow and black.

One layer can comprise the combination of cyan and magenta and the other layer can comprise the combination of yellow and black. This keeps the two colours furthest apart in wavelength (yellow and cyan) in separate layers.

The lens arrangement is selected to have focal distances which match the positions of the display layers. This may be achieved with standard lenses, but is it also possible to design the lens optics specifically for this purpose. For example, the lens arrangement can comprise a plurality of lenses, wherein the chromatic aberration of the plurality of lenses is greater than the chromatic aberration of each individual lens. Thus, chromatic aberration can be deliberately increased so that the wavelength-dependent focal distances match the display layer positions for the desired display layer designs. The lens arrangement can comprise a lens doublet.

BRIEF DESCRIPTION OF THE DRAWINGS

An example of the invention will now be described in detail with reference to the accompanying drawings, in which:

FIG. 3 is used to explain the problem encountered in the prior art and a device of the invention;

FIG. 4 is used to explain the colour modulation provided by a subtract CMY system.

DETAILED DESCRIPTION OF THE EMBODIMENTS

Figure 1A:
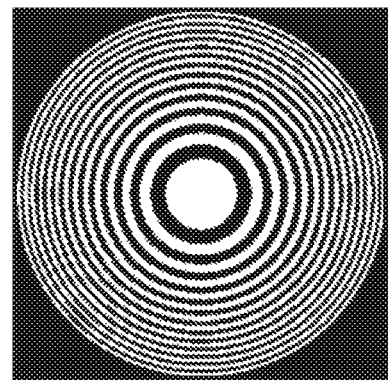
FIG. 1 shows two examples of zone plate and a photon sieve.
Figure 1B:
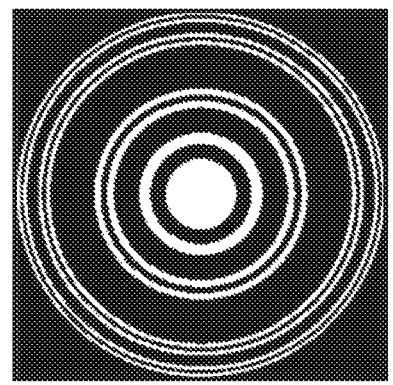
Figure 1C:
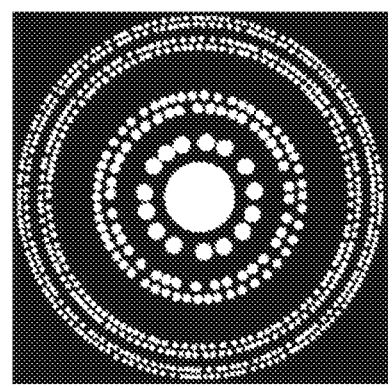
Figure 2A:
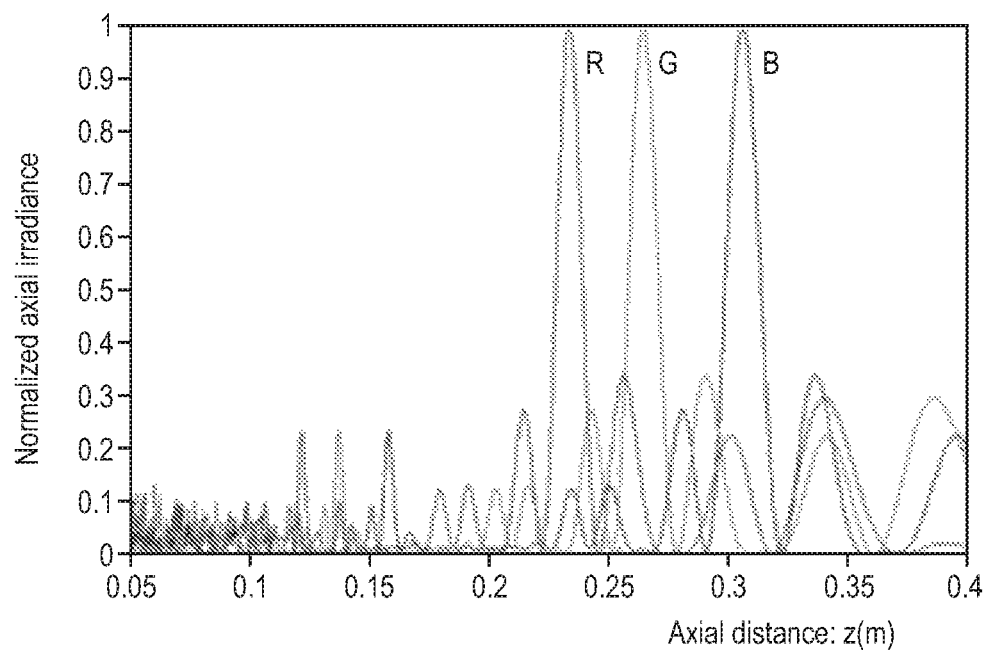
FIG. 2 shows the dependency of focal distance on wavelength for two of the diffractive lenses of FIG. 1.
Figure 2B:
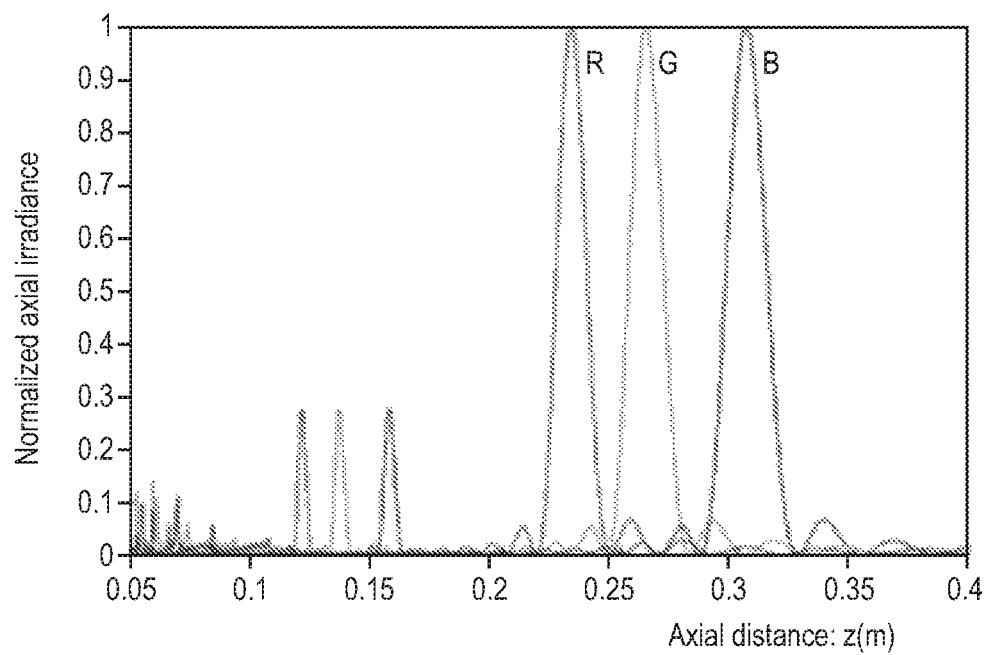

The invention provides a stacked display which has different colour layers ordered with respect to the wavelength-dependency of the lens focus so that there is better focus of the colours on the display layers that modulate those colours. The optical system can be designed to have a wavelength-dependent focus that matches the position of each of the light modulating layers.

In the arrangement of the invention the layers are thus ordered with respect to the wavelength-dependency of the lens focus; such that for RGB, green (G) is in the middle, and for CMY, magenta (M) is in the middle.

An optical system can be constructed which has a wavelength-dependent focus that matches the position of each of the light emitting or modulating layers.

FIG. 3(a) shows the problem encountered in a conventional structure. The display comprises a stack of light modulating layers 10a, 10b, and 10c.

In one example, the light modulating layers comprise light emitting layers, such as LED or OLED display layers. Alternatively, light transmissive layers can be used which modulate light from a backlight or modulate incident light in the case of a reflective display.

For the purpose of explanation, it is assumed that the effect of the lens chromatic aberration is small compared to the dimensions of the light modulating layers, so that all light through the lens (from infinity) can be considered to be focused to a common focal plane, in the middle 10b of the display stack This means the top and bottom display layer 10a, 10c are not in the focal plane of the lens structure.

The layer thickness is a function of the type of display used. It could be that a certain thickness is required to provide a sufficient contrast ratio. Each display layer functions as an intermediate transparent substrate if the electro-optical effect is physically confined to a single layer.

The focal length and pitch is decided based on the desired 3D experience. A low pitch to focal length ratio (a small cone), allows for a high 3D effect in a small region and a large pitch to focal length ratio provides a lesser 3D effect but over a larger viewing area.

The invention is based on the concept of tuning the wavelength dependence of the lens structure in order to keep the focus for one wavelength (typically green) fixed.

The invention can be applied to refractive optical components, diffractive optical components or combined lens systems.

In the case of refractive optical components (such as conventional glass or polymer lenticular lenses) chromatic aberration results in the focal distance for red being longest and for blue being shortest (when considering the RGB primaries).

In the case of diffractive optical components, the focal distance for blue is longest and for red is shortest.

FIG. 3(b) shows the approach of the invention applied to a combined lens system having a refractive component 30 and a diffractive component 32. The R, G and B light components are shown, for one example. Each component is focused on the display layer used to modulate that colour.

In this example, the lens system has the net effect of a longer focus for blue, like in a purely diffractive system. Both the diffractive and refractive lenses are positive but the ratio at which they contribute to the total lens power can be tuned. The refractive lens reduces the chromatic aberration that is caused by the diffractive lens. By tuning differently, the net effect can be made to have a longer focus for red, like in a purely refractive system.

Such a hybrid system can be tuned to the layer positions through optical simulation.

Assuming thin lenses:

$$1/f_A = 1/f_{1A} + 1/f_{2A}$$

$$1/f_B = 1/f_{1B} + 1/f_{2B}$$

Where $f_A$ is the focal length of the lens system for the modulating colour of layer A, $f_B$ is the focal length of the lens system for the modulating colour of another layer B, and $f_{1A}, f_{1B}, f_{2A}$, and $f_{2B}$ are the focal lengths of lens 1 and 2 in the system for the modulating colour of layer A and B, respectively. Layer A will typically be red or cyan and layer B will typically be blue or yellow.

As the focal length is wavelength-dependent, parameters such as materials, curvatures and zones should be tuned to result in a proper focal length for the layers in the system. That is, $f_A$ and $f_B$ should correspond to $sum_i [d_i/n_i]$ with $d_i$ thickness and $n_i$ the index of refraction (IOR) of the $i^{th}$ layer crossed, both for red and blue modulating layers.

This approach can be applied to different lens structures.

A first embodiment is based on the use of a refractive lenticular lens stack. A lenticular lens stack will typically have a wavelength-dependent focus.

In accordance with the invention, when using such a lens, the layers should be ordered such that the part of the spectrum that is light-modulated is in focus. In case of emissive layers (e.g. RGB), then a pixel of one colour modulates the wavelengths corresponding to that colour. In case of transmissive layers, then a subtractive colour scheme (e.g. CMY) is used. In this case, a pixel of one colour modulates its inverse (e.g. R, G and B respectively). Taking the cyan layer as an example: a pixel in the cyan layer can be modulated to be white (transparent) or cyan (or in between) and it means that the red part of the visible spectrum is modulated by the cyan pixel.

For this modulation to be effective, the red part of the spectrum needs to be focused on the layer so that the colour subtraction can take place. The other colours which are to be transmitted through the layer (to the next colour subtracting layer) do not need to be focused on that layer.

Thus, for a simple refractive system, the ordering when starting from the lens side should preferably be in order of increasing wavelength, e.g. BGR of YMC.

The invention is based on the appropriate ordering of the colour modulating layers, and additionally the design of the optics to provide that each colour modulating layer is at the appropriate focal distance. This may require use of a simple lens structure, or it may require some chromatic aberration modification to be applied to the lens structure.

It is possible to reduce dispersion by combining lenses. One such technique is the achromatic doublet. The achromatic doublet is a double lens system (cemented together or with a gap) by the following rule:

$$(f_a V_a)^{-1} + (f_b V_b)^{-1} = 0$$

Where $V_i$ are the Abbe numbers of the materials (a measure of dispersion) and $f_i$ are the focal lengths of each of the lenses in the doublet.

Similarly, by designing a different doublet, the chromatic aberration can be increased. Special care has to be taken to limit the increase of other lens aberrations to what is acceptable.

The table below shows a singlet with low Abbe number (high dispersion), an achromatic doublet, and a doublet designed to have a higher dispersion than the singlet.

| Description | f1 [BK7] (in mm) | f2 [SF5] (in mm) | fF: 486.13 nm (in mm) | d: 587.56 nm (in mm) | fC: 656.27 nm (in mm) | Δf/fd (in %) |
|---|---|---|---|---|---|---|
| Singlet | 0 | 8 | 7.8278 | 8.0000 | 8.0732 | 3.07 |
| Achromatic | 3.9788 | −7.9156 | 8.0036 | 8.0000 | 8.0045 | 0.06 |
| Dispersive | −1.3333 | 1.1429 | 7.3463 | 8.0000 | 8.2854 | 11.74 |

This table shows the wavelength-dependent paraxial focal length and longitudinal chromatic aberration for a SF5 singlet (f1=0) and doublets with BK7 and SF5 glass materials. The singlet is plano concave. For doublets, lens 1 has same radius on both sides (opposite sign). Lens 2 is cemented to lens 1.

In the table above:

f1 is the focal length (in air) of the first lens;
f2 is the focal length (in air) of the second lens;
fF is the focal length of the lens system for the F line (486.13 nm)
fd: is the focal length of the lens system for the d line (466.81 nm)
fC: is the focal length of the lens system for the C line (656.28 nm)
Δf/fd=100% (fC−fF)/fd, and this is an indication of the amount of chromatic aberration.

Such a refractive system can be tuned to the layer positions through optical simulation.

Even when a material with a low Abbe number is chosen, a refractive regular lens or lens system may not have a wavelength-dependent variation in focus that is extreme enough for a thick stack. For example, an electrowetting lens stack may well be 1 mm thick while the focal length could be only in the range 3 to 6 mm.

A zone plate or photon sieve as mentioned above has a stronger and opposite wavelength dependence than the dispersion of a refractive lens.

Thus, in a second example, a lenticular lens can be constructed from a zone plate or photon sieve, and the layers are ordered such that starting from the lens side, layers are in order of decreasing wavelength, e.g. RGB or CMY.

A typical strength for a lenticular lens applied to an autostereoscopic 3D display is to have a focal length (f) to pitch (p) ratio (c) of around 4 to 8. When a zone plate is applied, then the width of the outmost zone ($\Delta R_m$) may be approximated by:

$$\Delta R_m = f\lambda/2R_m = \lambda f/p = \lambda c.$$

For typical values of c equals 6 and λ equals 550 nm (green), $\Delta R_m$ equals 3.3 micrometers. This resolution is easily achievable by a lithographic process, and most likely also with cheaper techniques such as stamping.

The images of zone plates and photon sieves above are spherical. However it is possible to construct "cylindrical" zone plates. These may be referred to as linear Fresnel zone plates.

The focus of this type of diffractive optical system has a simple relation with wavelength. It is possible that a refractive lens or zone plate just provides the correct focal variation to match the display layer dimensions. However, two or more lenticular lenses could be combined to form a lens stack with at least one diffractive element and at least one refractive component, such as to achieve the desired focus for each relevant wavelength.

This is the approach shown schematically in FIG. 3(b). In the case that the diffractive zone plate or photon sieve has a stronger and opposite wavelength dependence than the dispersion of the refractive lens, the resulting wavelength dependency is as shown in FIG. 3(b), with larger focal length for the blue light than for the red light.

Increasing the focal length of the refractive component also increases the size of the thinnest zone.

As explained above, the "modulating colour" of a pixel component is the wavelength range that corresponds to maximum modulation. This is clear for an emissive pixel. For a subtractive colour system, this is less intuitive.

FIG. 4(a) shows the transmission spectrum of a CMY subtractive colour system. As shown, the yellow pixels selectively absorb blue (around 450 nm), the magenta pixels selectively absorb green (around 520 nm) and the cyan pixels selectively absorb red (around 700 nm).

The colour modulation function for the system is shown in FIG. 4(b), which for a subtractive system corresponds to the inverse of the transmission function. On this basis, the yellow pixels are considered to modulate in the blue wavelength range, the magenta pixels modulate in the green wavelength range and the cyan pixels modulate in the red colour range.

The description above is based on the beneficial use of axial chromatic aberration. Lateral chromatic aberration is however something that should be compensated for when assigning view positions to pixels. This effectively changes the view mask.

The invention improves the 3D image quality within the primary cone. With different foci per layer, the 3D image may be distorted for secondary cones. Thus, the invention is of particular interest for single-user devices such as e-books and tablets.

The invention is not limited to three colour systems.

A problem with the CMY colour subtractive system is to produce good blacks. A solution is the CMYK colour system with K for black. Some light modulating systems are able to control two pigments/inks per layer, such that a CMYK system can be implemented with only layers modulating layers. In that case, it is preferred to arrange cyan (C) and yellow (Y) in separate layers. For instance, cyan and magenta could be in the top layer, and yellow and black in the bottom layer.

Thus, the invention can also be applied to four colour systems.

The invention also applies to limited colour layered displays. Limited colour displays have only two colour components. An example is a subtractive colour system with black and red. Another example is an additive colour system with just blue and green. The order of the layers should match the wavelength-dependent focus of the lens system according to the modulating colour of each layer.

FIG. 5 shows the light modulating function of the pixel layers for various colour systems.

Figure 5A:
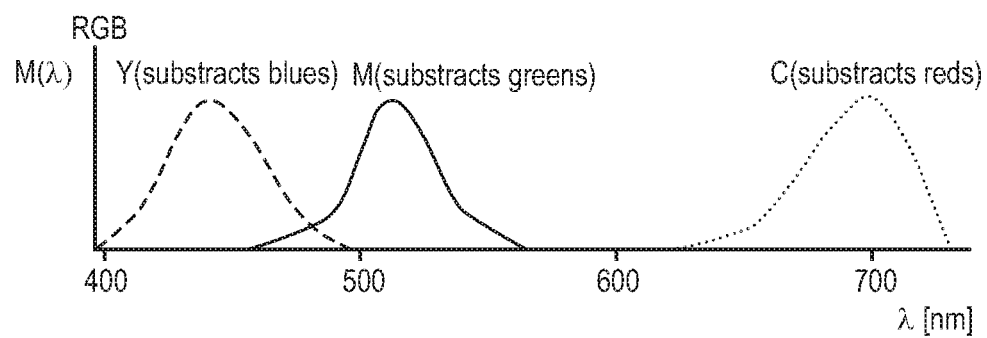
FIG. 5 shows various alternative colour systems.

FIG. 5(a) shows the basic RGB additive colour system.

Figure 5B:
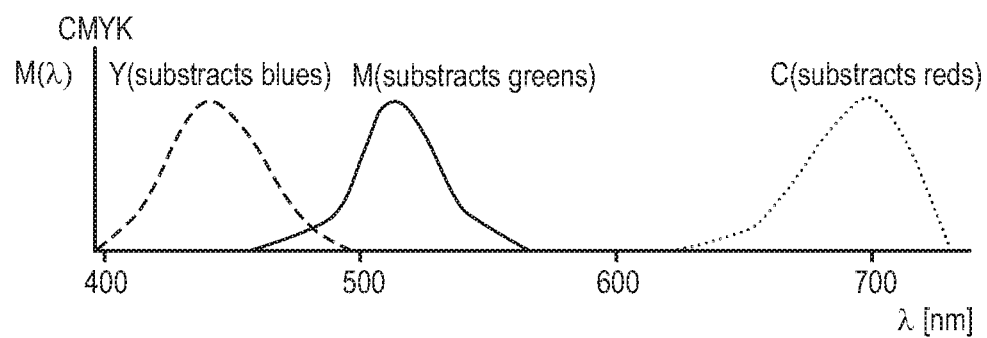

FIG. 5(b) shows the CMY subtractive colour system, and this corresponds to FIG. 4(b).

Figure 5C:
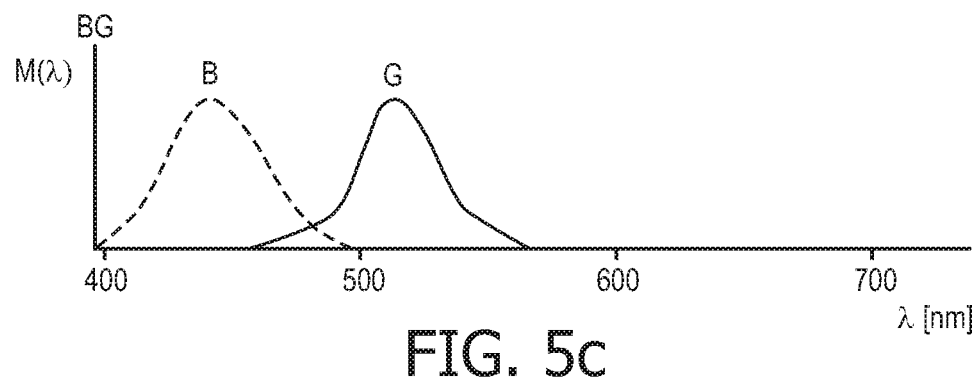

FIG. 5(c) shows a BG (blue green) limited colour additive colour system, with only two pixel colours.

Figure 5D:
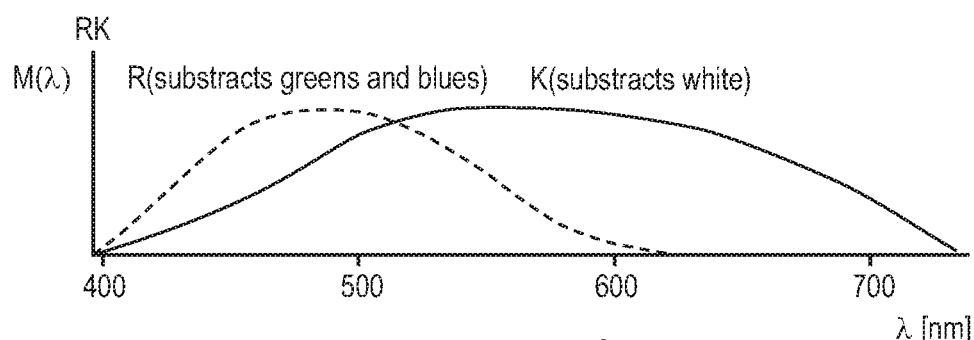

FIG. 5(d) shows a RK (red black) limited colour subtractive colour system. The red pixels subtract greens and blues, and thus have a modulation function at the low wavelength range, and the black pixels subtract white, thus having a broader modulation function but centred at a higher wavelength. The centre wavelength of each modulation peak is taken into account for the lens design in the manner explained above.

Figure 5E:
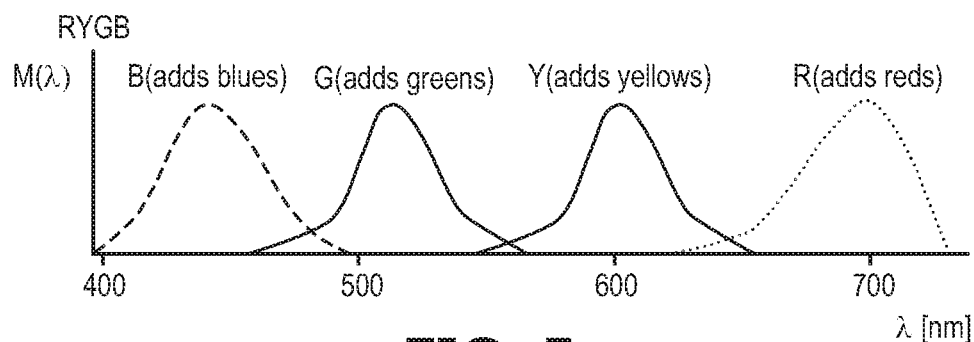

FIG. 5(e) shows an RYGB multi-primary additive colour system, which adds a yellow component to the plots shown in FIG. 5(b).

There are also RGBW (W=white) and RCBY multi-primary systems.

The subtractive display design can use electrophoretic, electrochromic or electrowetting display technologies. The emissive display design can use any emissive technology which can be arranged to be transparent (outside the emissive pixel area). For example, electroluminescent, OLED or discrete LED display technologies can be used.

The invention is applicable to all 3D lenticular displays based on stacked displays, such as full-gamut reflective displays, with particular interest for single-user devices such as e-books and tablets.

The invention can use existing display technologies in combination with existing lens technologies, and the invention resides in the positioning and choice of these components to achieve the desired focusing effect. For this reason, the underlying technologies have not been described in detail.

The display can be a single view stereoscopic design (two views) or a multiple view stereoscopic display (multiple pairs of views). The geometrical design of the lens arrangement and pixel arrangement will be in accordance with standard principles for autostereoscopic display design.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
   a display arrangement for providing a pixelated display output; and
   a lens arrangement for directing different views in different directions thereby enabling autostereoscopic viewing,
   wherein the display arrangement comprises a stack of display layers, comprising at least a first and a second display layer, each layer for modulating one color or a set of colors,
   wherein the lens arrangement has a first focal distance for a first color and a second focal distance for a second color,
   wherein the first display layer is closer to the first focal distance than the second focal distance and modulates the first color, and
   wherein the second display layer is closer to the second focal distance than the first focal distance and modulates the second color.

2. The device as claimed in claim 1, comprising three display layers, and wherein the central layer modulates the color that is most central to the visible spectrum.

3. The device as claimed in claim 1, wherein the display layers comprise light emissive layers.

4. The A device as claimed in claim 3, wherein the display comprises a light emissive layer for generating a red light output, a light emissive layer for generating a green light output, and a light emissive layer for generating a blue light output.

5. The device as claimed in claim 4, wherein the lens arrangement comprises a refractive lens arrangement, wherein the display layers are ordered, in the direction starting at the lens arrangement, with modulating color in order of increasing wavelength, or wherein the lens arrangement comprises a diffractive lens arrangement, wherein the display layers are ordered, in the direction starting at the lens arrangement, with modulating color in order of decreasing wavelength.

6. The device as claimed in claim 5, wherein the lens arrangement comprises a Fresnel zone plate, a fractal zone plate or a fractal photon sieve.

7. The device as claimed in claim 1, wherein the display layers comprise at least two light subtractive layers.

8. The device as claimed in claim 7, wherein the display layers comprise a cyan light subtractive layer for subtracting red light output, a magenta light subtractive layer for subtracting a green light output, and a yellow light subtractive layer for subtracting a blue light output.

9. The device as claimed in claim 8, wherein the lens arrangement comprises a refractive lens arrangement, wherein the display layers are ordered, in the direction starting at the lens arrangement, with modulating color, namely the color at which there is maximum color subtraction, in order of increasing wavelength, or wherein the lens arrangement comprises a diffractive lens arrangement, wherein the display layers are ordered, in the direction starting at the lens arrangement, with modulating color in order of decreasing wavelength.

10. The device as claimed in claim 9, wherein the lens arrangement comprises a Fresnel zone plate, a fractal zone plate or a fractal photon sieve.

11. The device as claimed in claim 7, comprising a reflective display having a reflector on the opposite side of the display layers to the lens arrangement.

12. The device as claimed in claim 1, wherein the display layers comprise a first light subtractive layer comprising the combination of two colors from cyan, magenta, yellow and black and a second light subtractive layer comprising the combination of the other two colors from cyan, magenta, yellow and black.

13. The device as claimed in claim 12, wherein one layer comprises the combination of cyan and magenta and the other layer comprises the combination of yellow and black.

14. The device as claimed in claim 1, wherein the lens arrangement comprises a plurality of lenses, wherein the chromatic aberration of the plurality of lenses is greater than the chromatic aberration of each individual lens.

15. The device as claimed in claim 14, wherein the lens arrangement comprises a lens doublet.

16. The device as claimed in claim 1, wherein each display layer is selected from the group consisting of an electrophoretic, electrochromic or electrowetting display layer.

17. The device as claimed in claim 1, wherein each display layer comprises an emissive display layer selected from the group consisting of an electroluminescent, OLED or discrete LED display layer.

* * * * *